US011894602B2

(12) United States Patent
Lee

(10) Patent No.: US 11,894,602 B2
(45) Date of Patent: Feb. 6, 2024

(54) ANTENNA STRUCTURE FORMED IN BRACKET AND ELECTRONIC DEVICE INCLUDING SAME

(71) Applicant: Samsung Electronics Co., Ltd., Gyeonggi-do (KR)

(72) Inventor: Minju Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 17/288,073

(22) PCT Filed: Nov. 14, 2019

(86) PCT No.: PCT/KR2019/015510
§ 371 (c)(1),
(2) Date: Apr. 23, 2021

(87) PCT Pub. No.: WO2020/101379
PCT Pub. Date: May 22, 2020

(65) Prior Publication Data

US 2021/0384614 A1 Dec. 9, 2021

(30) Foreign Application Priority Data

Nov. 14, 2018 (KR) ........................ 10-2018-0139835

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/48* (2013.01); *H01Q 9/045* (2013.01)

(58) Field of Classification Search
CPC .......... H01Q 1/38; H01Q 1/242; H01Q 1/243; H01Q 1/48
See application file for complete search history.

(56) References Cited

U.S. PATENT DOCUMENTS 9,413,080 B2 8/2016 Park et al.
9,819,073 B2 11/2017 Park et al.
(Continued)

FOREIGN PATENT DOCUMENTS

KR 10-2013-0106213 A 9/2013
KR 10-2015-0051588 A 5/2015
(Continued)

OTHER PUBLICATIONS

Korean Office Action dated Apr. 3, 2023.

*Primary Examiner* — Lam T Mai
(74) *Attorney, Agent, or Firm* — Cha & Reiter, LLC

(57) ABSTRACT

An electronic device includes a bracket including a first structure at least partially having non-conductivity, a second structure disposed on a first surface of the first structure and at least partially having conductivity, and an antenna pattern electrically connected with the second structure and disposed on a second surface of the first structure, and a printed circuit board including a grounding part and a feeding part. The grounding part is electrically connected with the second structure, and the feeding part is electrically connected with a portion of the antenna pattern.

13 Claims, 15 Drawing Sheets

(51) Int. Cl.
*H01Q 1/48* (2006.01)
*H01Q 9/04* (2006.01)

(56) References Cited

U.S. PATENT DOCUMENTS

| | | | | |
|---|---|---|---|---|
| 10,199,719 | B2 | 2/2019 | Kim et al. | |
| 10,403,964 | B2 | 9/2019 | Yoo et al. | |
| 10,581,140 | B2 | 3/2020 | Lee et al. | |
| 2009/0256759 | A1* | 10/2009 | Hill | H01Q 9/06 343/702 |
| 2011/0006954 | A1* | 1/2011 | Seo | H01Q 9/40 343/702 |
| 2014/0292590 | A1 | 10/2014 | Yoo et al. | |
| 2014/0354499 | A1* | 12/2014 | Legay | H01Q 3/26 343/778 |
| 2016/0204514 | A1* | 7/2016 | Miraftab | H01Q 21/005 343/731 |
| 2016/0329629 | A1* | 11/2016 | Park | H01Q 21/30 |
| 2019/0006751 | A1* | 1/2019 | Chen | H04B 7/10 |
| 2020/0028241 | A1 | 1/2020 | Jung et al. | |
| 2020/0267847 | A1* | 8/2020 | Lee | H04M 1/0277 |
| 2023/0051681 | A1* | 2/2023 | Jang | H04B 1/3888 |
| 2023/0136210 | A1* | 5/2023 | Kim | H01Q 21/08 343/702 |
| 2023/0163488 | A1* | 5/2023 | Park | H01Q 1/246 343/893 |
| 2023/0178876 | A1* | 6/2023 | Park | G06F 1/1626 343/872 |
| 2023/0213771 | A1* | 7/2023 | Choe | H01Q 1/38 345/8 |
| 2023/0253698 | A1* | 8/2023 | An | H01Q 9/0407 343/702 |

FOREIGN PATENT DOCUMENTS

| | | | |
|---|---|---|---|
| KR | 10-2016-0094791 | A | 8/2016 |
| KR | 10-1686784 | B1 | 12/2016 |
| KR | 10-2017-0124815 | A | 11/2017 |
| KR | 10-2017-0133594 | A | 12/2017 |
| KR | 10-2018-0031120 | A | 3/2018 |

* cited by examiner

ANTENNA STRUCTURE FORMED IN BRACKET AND ELECTRONIC DEVICE INCLUDING SAME

CROSS REFERENCE TO RELATED APPLICATIONS

This application is a National Phase Entry of PCT International Application No. PCT/KR2019/015510, which was filed on Nov. 14, 2019, and claims a priority to Korean Patent Application No. 10-2018-0139835, which was filed on Nov. 14, 2018, the contents of which are incorporated herein by reference.

TECHNICAL FIELD

Embodiments of the disclosure relate to a technology of realizing an antenna using a bracket.

BACKGROUND ART

With the development of mobile communication technologies, an electronic device has been changed to be in the form easy to carry and to freely connect to wired/wireless networks. For example, a portable electronic device, such as a smartphone or a tablet personal computer (PC), is equipped with an antenna to transmit or receive a wireless signal to access the wireless communication network.

The electronic device may include an antenna to transmit or receive signals in various frequency bands. As a wireless communication technology has been developed, frequencies and required frequency bandwidths have been increased in a wireless communication device, and the number of antennas corresponding to relevant frequencies has been increased. However, as it has been a trend that a light, slim, short, and small electronic device is developed, a space for mounting an antenna has been excessively reduced.

DISCLOSURE

Technical Problem

Although the electronic device mounts an antenna by using a grounding part of a printed circuit board or a carrier such that the antenna is realized inside a constrained antenna mounting space, as a circuit part included in the printed circuit board is changed, antenna performance may be changed or costs for manufacturing the carrier may be additionally increased.

Various embodiments of the disclosure are to provide an antenna structure capable of uniformly maintaining performance regardless of the change of a circuit part included in a printed circuit board.

Various embodiments of the disclosure are to provide an antenna structure capable of reducing additional costs for manufacturing a carrier by manufacturing the antenna structure together with a bracket when the bracket is manufactured.

Technical Solution

According to an embodiment of the disclosure, an electronic device may include a bracket including a first structure at least partially having non-conductivity, a second structure disposed on a first surface of the first structure and at least partially having conductivity, and an antenna pattern electrically connected with the second structure and disposed on a second surface of the first structure, and a printed circuit board including a grounding part and a feeding part. The grounding part may be electrically connected with the second structure, and the feeding part may be electrically connected with a portion of the antenna pattern.

According to an embodiment of the disclosure, an antenna structure realized in a bracket may include a first structure having non-conductivity, a second structure having conductivity and disposed on a first surface of the first structure, and an antenna pattern electrically connected with the second structure and disposed on a second surface of the first structure.

According to an embodiment of the disclosure, an electronic device may include a carrier having an antenna pattern, a bracket including a first structure at least partially having non-conductivity, and a second structure disposed on a first surface of the first structure and at least partially having conductivity, and a printed circuit board disposed on a second surface of the first structure, interposed between the carrier and the bracket, and including a grounding part and a feeding part. The grounding part may be electrically connected with the first structure and a first part of the antenna pattern, and the feeding part may be electrically connected with a second part of the antenna pattern.

Advantageous Effects

According to embodiments of the disclosure, the antenna performance may be uniformly maintained regardless of the change of the circuit part included in the printed circuit board.

According to embodiments of the disclosure, the additional costs for manufacturing the carrier may be reduced by manufacturing the antenna structure together with a bracket, when the bracket is manufactured.

According to embodiments of the disclosure, the mechanical stiffness of the bracket in the double-injection molded structure may be increased.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
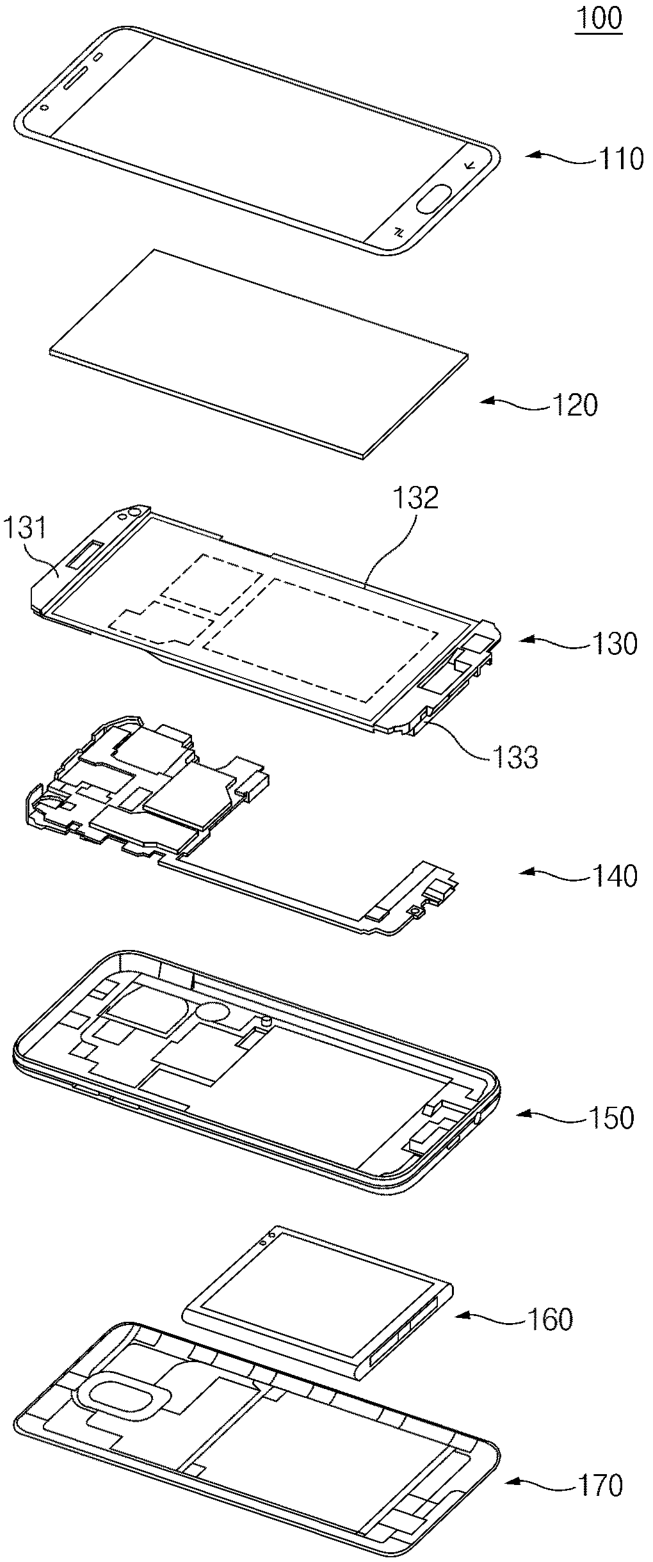
FIG. 1 is an exploded perspective view of an electronic device, according to an embodiment of the disclosure.

FIG. 1 is an exploded perspective view of an electronic device, according to an embodiment of the disclosure.

According to an embodiment, an electronic device 100 may include a front cover 110, a display panel 120, a bracket 130, a printed circuit board 140, a side bezel structure 150, a battery 160, and a rear cover 170. According to an embodiment, the electronic device 100 may not include at least one of the above-described components or may further include any other component(s).

According to an embodiment, the front cover 110 may be at least partially formed of a glass which is substantially transparent. The glass may be formed of a glass plate or a polymer plate including various coating layers. The front cover 110 may transmit light generated from the display panel 120, or light incident onto various sensors (an image sensor, an iris sensor, or a proximity sensor) disposed on the front surface of the electronic device 100. The rear cover 170 may be formed of a cover which is substantially opaque. The cover may be formed of, for example, coated or colored glass, ceramic, polymer, metal (e.g., aluminum, stainless steel (STS), or magnesium) or the combination of the above materials. The side bezel structure 150 is coupled to the front cover 110 and the rear cover 170 to form a housing of the electronic device 100. The housing may form an outer appearance of the electronic device 100 and may protect internal components of the electronic device 100 from external environments (moisture or impact).

According to an embodiment, the display panel 120 may be disposed under the front cover 110. At least a portion of the display panel 120 may be exposed through the glass. According to an embodiment, the shape of the edge of the display panel 120 may be formed substantially identically to the shape of an outer portion, which is adjacent to the edge, of the glass. According to another embodiment (not illustrated), to expand an area for exposing the display panel 120, the distance between an outer portion of the display panel 120 and an outer portion of the glass may be substantially uniformly formed. The display panel 120 may be seated on a first surface of the bracket 130. The display panel 120 may be connected with a processor (e.g., a processor 1320 of FIG. 13) of the electronic device 100 by using a flexible printed circuit board (FPCB). The display panel 120 may receive image data from the processor and may display an image to be displayed by the processor. According to various embodiments, the display panel 120 is electrically connected with the printed circuit board 140 to output content (e.g., a text, an image, a video, an icon, a widget, or a symbol), or to receive a touch input (e.g., a touch, a gesture, or a hovering) from a user.

According to an embodiment, the bracket 130 may be disposed inside the electronic device 100. For example, the bracket 130 may include a first structure 131, a second structure 132, and an antenna pattern 133. The antenna pattern 133 may be electrically connected with the second structure 132. The second structure 132 may be disposed on a first surface (e.g., the first surface of the bracket 130) of the first structure 131, and the antenna pattern 133 may be disposed on a second surface (e.g., the second surface of the bracket 130) of the first structure 131. The first structure 131 may be formed of a first material (e.g., a polymer material), and the second structure 132 and the antenna pattern 133 may be formed of a second material (e.g., a metal material). Alternatively, the second structure 132 and the antenna pattern 133 may be formed of a metal material, but may be formed of the same metal material or different metal materials.

According to an embodiment, the first structure 131, the second structure 132, and the antenna pattern 133 may be integrally formed in a double-injection manner. For example, the second structure 132 and the antenna pattern 133 may be formed, and then the first structure 131 may be formed to be matched with the second structure 132.

According to an embodiment, the antenna pattern 133 may be formed by extending a portion of the second structure 132. A portion of the antenna pattern 133 may be disposed inside the first structure 131. A connection part between the second structure 132 and the antenna pattern 133 may pass through the first structure 131. The second structure 132 and the antenna pattern 133 may fix the first structure 131 on surfaces opposite to each other, and may more improve the mechanical stiffness of the bracket 130, when compared to a structure including only the second structure 132.

According to an embodiment, at least a portion of the second structure 132 may be used as a grounding part of the printed circuit board 140 or used as a grounding part of the antenna pattern 133. The at least a portion of the antenna pattern 133 may be connected with the feeding part or the grounding part of the printed circuit board 140.

According to an embodiment, at least a portion of the printed circuit board 140 may be disposed on the second surface (e.g., the surface on which the antenna pattern 133 is formed) of the bracket 130. The processor (e.g., the processor 1320 of FIG. 13) may be disposed on the printed circuit board 140. The processor may include, for example, at least one of a central processing unit, an application processor, a graphic processing unit, an image signal processor, a sensor hub processor, or a communication processor. A wireless communication circuit (e.g., a communication module 1190 of FIG. 13) may be disposed on the printed circuit board 140. The wireless communication circuit may make local area network communication with an external device or may wirelessly transmit or receive power necessary for charging. The printed circuit board 140 may include a grounding part. The grounding part of the printed circuit board 140 may function as a ground of an antenna realized with a wireless communication circuit.

According to an embodiment, the battery 160 may convert chemical energy into electrical energy and vice versa. For example, the battery 160 may convert chemical energy into electrical energy, and supply the converted electrical energy to the display panel 120 and various components or modules mounted on the printed circuit board 140. According to an embodiment, the printed circuit board 140 may include a power management module to manage charging/discharging of the battery 160.

FIGS. 2 to 5 illustrate an antenna structure using a bracket, according to various embodiments of the disclosure.

Figure 2:
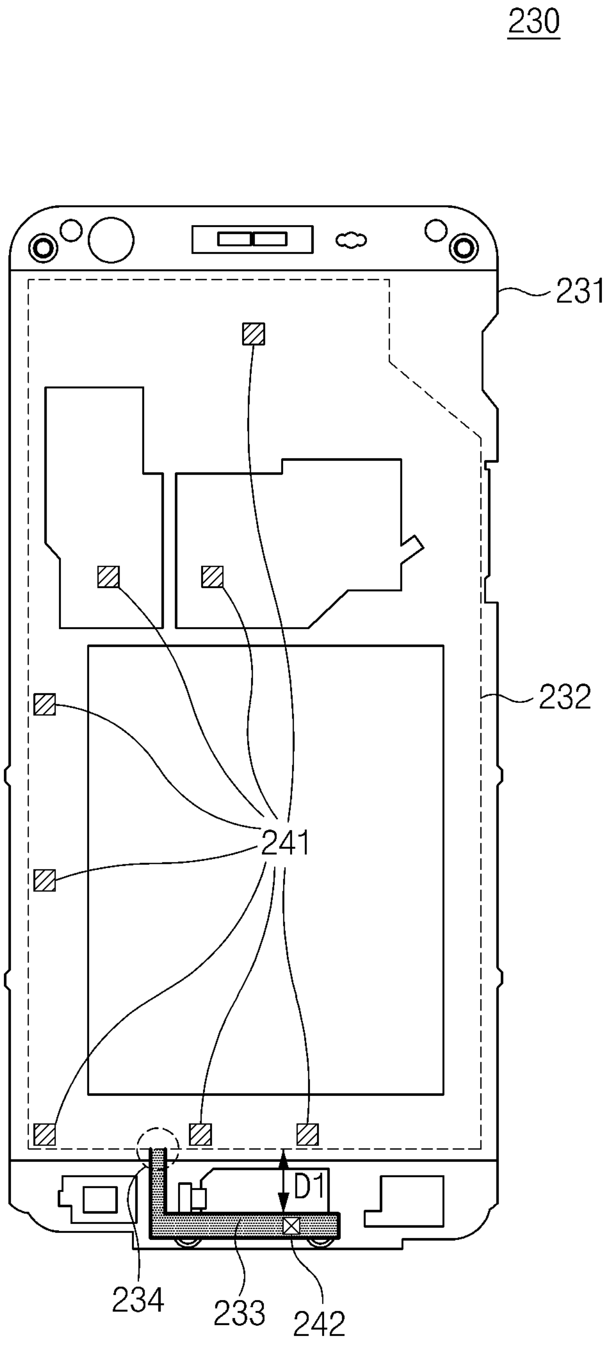
FIG. 2 is a view illustrating an antenna pattern disposed at a lower portion of a bracket, according to an embodiment.
Figure 3:
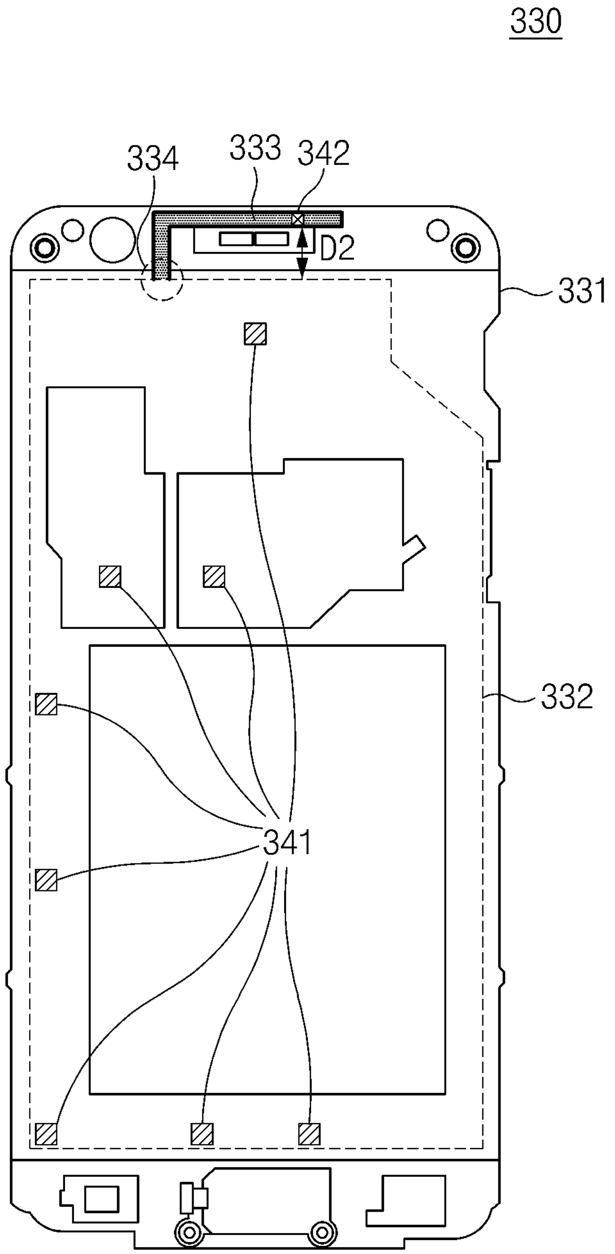
FIG. 3 is a view illustrating an antenna pattern disposed at an upper portion of a bracket, according to an embodiment.
Figure 4:
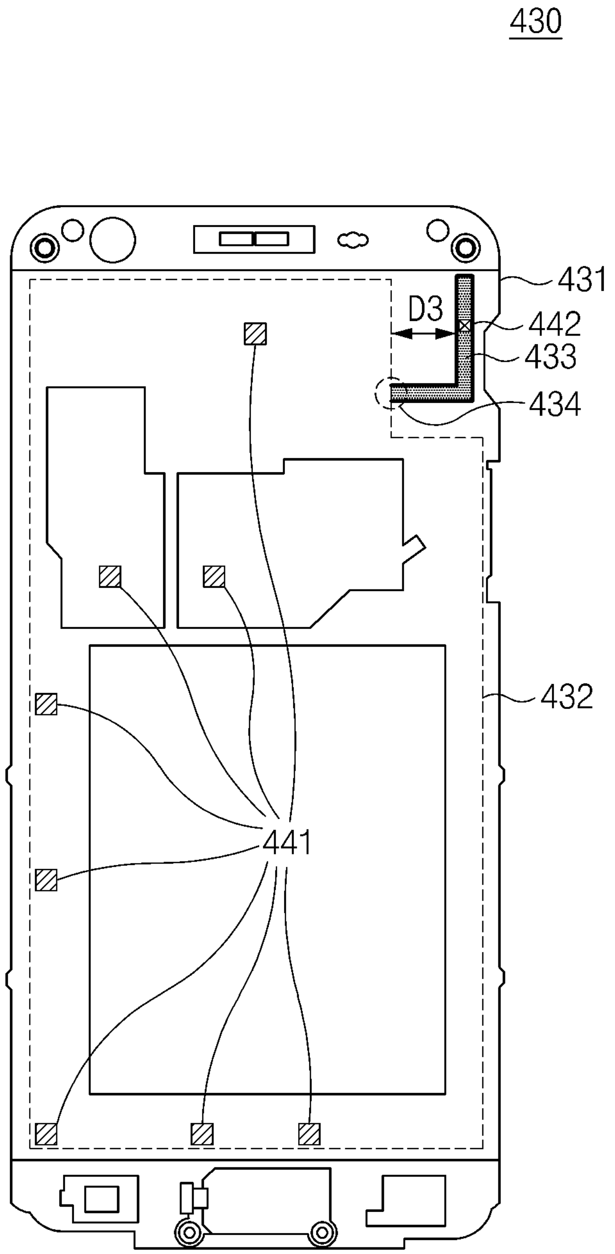
FIG. 4 is a view illustrating an antenna pattern disposed upward of a side surface of a bracket, according to an embodiment.
Figure 5:
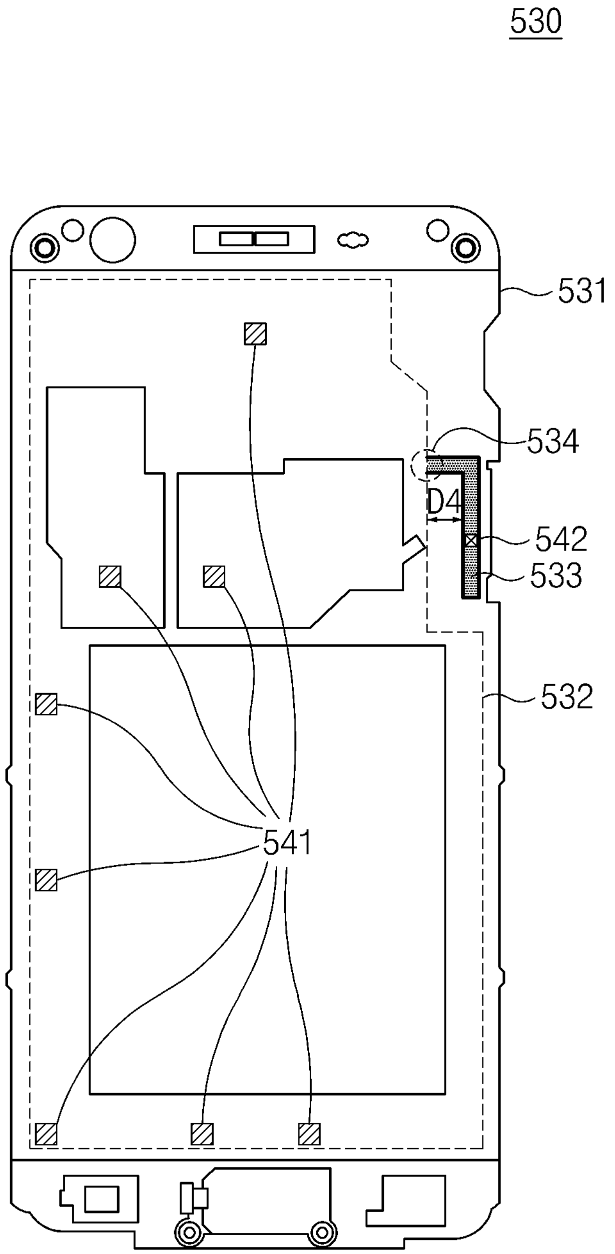
FIG. 5 is a view illustrating an antenna pattern disposed downward of a side surface of a bracket, according to an embodiment.

FIG. 2 is a view illustrating an antenna pattern disposed at a lower portion of a bracket, according to an embodiment, and FIG. 3 is a view illustrating an antenna pattern disposed at an upper portion of the bracket, according to an embodiment. FIG. 4 is a view illustrating an antenna pattern disposed upward of a side surface of a bracket, according to an embodiment, and FIG. 5 is a view illustrating an antenna pattern disposed downward of a side surface of a bracket, according to an embodiment.

Referring to FIGS. 2 to 5, brackets 230, 330, 430, and 530 (e.g., the bracket 130) may include first structures 231, 331, 431, and 531 (e.g., the first structure 131), second structures 232, 332, 432, and 532 (e.g., the second structure 132), and antenna patterns 233, 333, 433, and 533 (e.g., the antenna pattern 133), respectively. The antenna patterns 233, 333, 433, and 533 may be electrically connected with the second structures 232, 332, 432, and 532 through pattern connection parts 234, 334, 434, and 534, respectively. The antenna patterns 233, 333, 433, and 533 may be formed by extending portions of the second structures 232, 332, 432, and 532, respectively. Portions of the antenna patterns 233, 333, 433, and 533 may be disposed inside the first structures 231, 331, 431, and 531.

According to an embodiment, the second structures 232, 332, 432, and 532 and the antenna patterns 233, 333, 433, and 533 may be simultaneously formed in a single process. Alternatively, after the second structures 232, 332, 432, and 532 are formed, the antenna patterns 233, 333, 433, and 533 may be separately formed through an additional process. The second structures 232, 332, 432, and 532 and the antenna patterns 233, 333, 433, and 533 may fix the first structures 231, 331, 431, and 531 on surfaces opposite to each other, respectively, and the mechanical stiffness of the brackets 230, 330, 430, and 530 may be improved, when compared to structures including only the second structures 232, 332, 432, and 532.

According to an embodiment, the second structures 232, 332, 432, and 532 are disposed on the first surfaces of the first structures 231, 331, 431, and 531, respectively, and the antenna patterns 233, 333, 433, and 533 may be disposed on the second surfaces of the first structures 231, 331, 431, and 531, respectively. The pattern connection parts 234, 334, 434, and 534 may pass through the first structures 231, 331, 431, and 531, respectively. Printed circuit boards (e.g., the printed circuit board 140) are disposed to be seated on the second surfaces of each of the first structures 231, 331, 431, and 531, respectively, and may be electrically connected to the second structures 232, 332, 432, and 532, respectively, through ground coupling parts 241, 341, 441, and 541. The printed circuit boards may be electrically connected with the antenna patterns 233, 333, 433, and 533 through feeding coupling parts 242, 342, 442, and 542, respectively.

According to an embodiment, the first structures 231, 331, 431, and 531, the second structures 232, 332, 432, and 532, and the antenna patterns 233, 333, 433, and 533 may be integrally formed, respectively, in a double-injection manner. The first structures 231, 331, 431, and 531 may include materials different from materials of the second structures 232, 332, 432, and 532 and materials of the antenna patterns 233, 333, 433, and 533. For example, the first structures 231, 331, 431, and 531 may be formed of a first material (e.g., a polymer material), and the second structures 232, 332, 432, and 532 and the antenna patterns 233, 333, 433, and 533 may be formed of a second material (e.g., a metal material).

According to an embodiment, referring to FIG. 2, the antenna pattern 233 may be disposed at the lower portion of the first structure 231. The antenna pattern 233 may be electrically connected with the second structure 232 through the pattern connection part 234. The pattern connection part 234 may pass through the first structure 231. The antenna pattern 233 may be electrically connected with the feeding part of the printed circuit board through the feeding coupling part 242. The antenna pattern 233 may be formed to have a first distance ‘D1’ to the second structure 232. For example, the antenna pattern 233 may be disposed in parallel to the second structure 232, while maintaining the first distance ‘D1’ to the second structure 323.

According to an embodiment, referring to FIG. 3, the antenna pattern 333 may be disposed at the upper portion of the first structure 331. The antenna pattern 333 may be electrically connected with the second structure 332 through the pattern connection part 334. The pattern connection part 334 may pass through the first structure 331. The antenna pattern 333 may be electrically connected with the feeding part of the printed circuit board through the feeding coupling part 342. The antenna pattern 333 may be formed to have a second distance ‘D2’ to the second structure 332. For example, the antenna pattern 333 may be disposed in parallel to the second structure 332, while maintaining the second distance ‘D2’ to the second structure 332.

According to an embodiment, referring to FIG. 4, the antenna pattern 433 may be disposed on a side surface of the first structure 431. The antenna pattern 433 may be disposed while extending upward of the first structure 431. The antenna pattern 433 may be electrically connected with the second structure 432 through the pattern connection part 434. The pattern connection part 434 may pass through the first structure 431. The antenna pattern 433 may be electrically connected with the feeding part of the printed circuit board through the feeding coupling part 442. The antenna pattern 433 may be formed to have a third distance ‘D3’ to the second structure 432. For example, the antenna pattern 433 may be disposed in parallel to the second structure 432, while maintaining the third distance ‘D3’ to the second structure 432.

According to an embodiment, referring to FIG. 5, the antenna pattern 533 may be disposed on the side surface of the first structure 531. The antenna pattern 533 may be disposed while extending downward of the first structure 531. The antenna pattern 533 may be electrically connected with the second structure 532 through the pattern connection part 534. The pattern connection part 534 may pass through the first structure 531. The antenna pattern 533 may be electrically connected with the feeding part of the printed circuit board through the feeding coupling part 542. The antenna pattern 533 may be formed to have a fourth distance ‘D4’ to the second structure 532. For example, the antenna pattern 533 may be disposed in parallel to the second structure 532, while maintaining the fourth distance 'D4' to the second structure 532.

As described above, according to various embodiments, the antenna patterns 233, 333, 433, and 533 may serve as portions of the brackets 230, 330, 430, and 530 and may be formed together with the second structures 232, 332, 432, and 532. Accordingly, the performance of the antenna of the electronic device (e.g., the electronic device 100) may be uniformly maintained regardless of the change of the circuit mounted on the printed circuit board (e.g., the printed circuit board 140). In addition, the manufacturing costs of the electronic device may be reduced, because an additional carrier for forming the antenna pattern is not required.

Figure 6:
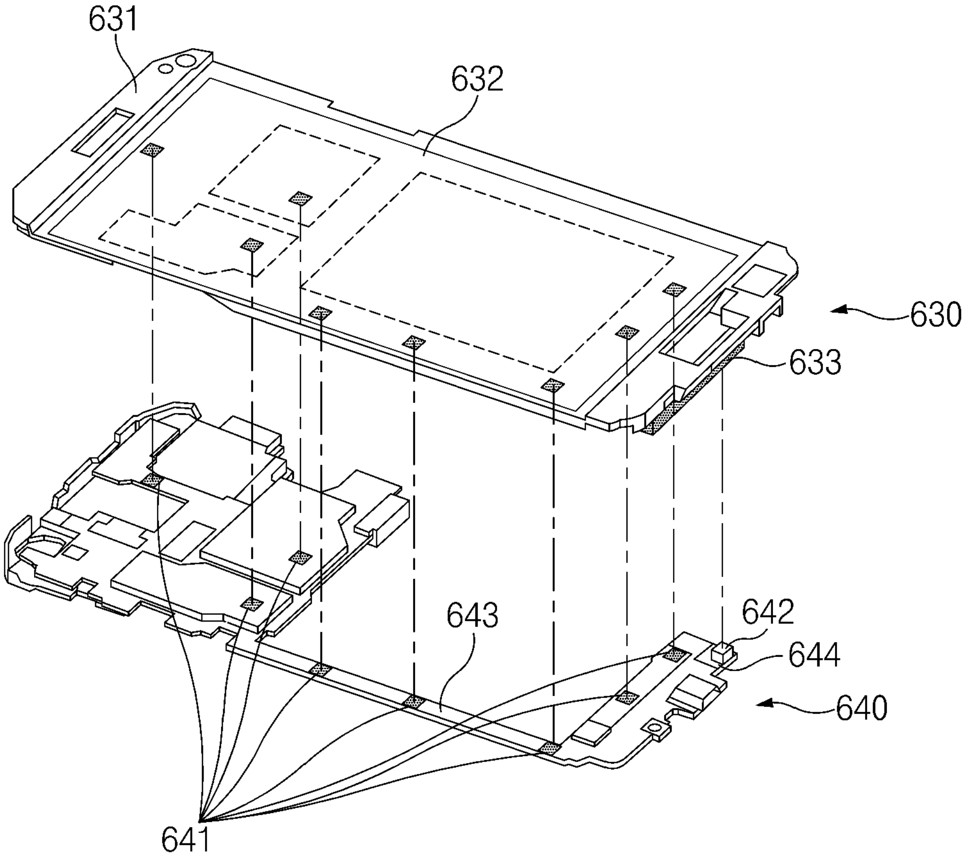
FIG. 6 is a perspective view illustrating a connection relationship between a bracket and a printed circuit board, according to an embodiment of the disclosure.

FIG. 6 is a perspective view illustrating a connection relationship between a bracket and a printed circuit board, according to an embodiment of the disclosure.

Referring to FIG. 6, a bracket 630 (e.g., the bracket 130) may be disposed on a printed circuit board 640 (e.g., the printed circuit board 140). For example, the bracket 630 may include a first structure 631, a second structure 632, and an antenna pattern 633. The second structure 632 may be disposed on a first surface of the first structure 631, and the antenna pattern 633 may be disposed on a second surface of the first structure 631. The second structure 632 and the antenna pattern 633 may be electrically connected with each other through a pattern connection part passing through the first structure 631. A portion of the antenna pattern 633 may be disposed inside the first structure 631. The printed circuit board 640 may be coupled to the second surface of the first structure 631.

According to an embodiment, the printed circuit board 640 may include at least one ground coupling part 641 and a PCB grounding part 643. The ground coupling part 641 may be electrically connected with the PCB grounding part 643. For example, the PCB grounding part 643 may be formed widely on the entire portion of the printed circuit board 640. The PCB grounding part 643 may be electrically connected with the second structure 632 through the ground coupling part 641. For example, the PCB grounding part 643 and the second structure 632 may form one grounding part. A portion of the at least one ground coupling part 641 may be connected with the second structure 632 through the first structure 631. The first structure 631 may have a hole for passing through the ground coupling part 641.

According to an embodiment, the printed circuit board 640 may include a feeding coupling part 642 and a PCB feeding part 644. The feeding coupling part 642 may be electrically connected with the PCB feeding part 644. The PCB feeding part 644 may feed power to the antenna pattern 633 through the feeding coupling part 642.

According to an embodiment, the at least one ground coupling part 641 and the feeding coupling part 642 may be a C-clip or a conductive tape.

Figure 7:
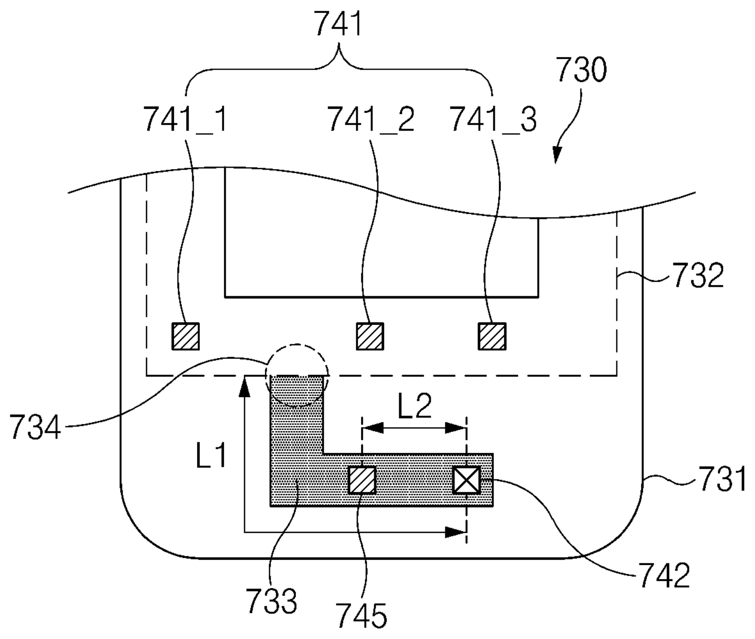
FIG. 7 is a view illustrating a method for employing various resonance frequencies in an antenna employing a bracket, according to an embodiment of the disclosure.

FIG. 7 is a view illustrating a method for employing various resonance frequencies in an antenna employing a bracket, according to an embodiment of the disclosure.

Referring to FIG. 7, a bracket 730 (e.g., the bracket 130) may include a first structure 731, a second structure 732, and an antenna pattern 733. The second structure 732 may be disposed on a first surface of the first structure 731, and the antenna pattern 733 may be disposed on a second surface of the first structure 731. The antenna pattern 733 may be electrically connected with the second structure 732 through a pattern connection part 734. The pattern connection part 734 may pass through the first structure 731.

According to an embodiment, the second structure 732 may be electrically connected with a PCB grounding part (e.g., the PCB grounding part 643) of a printed circuit board (e.g., the printed circuit board 640) through at least one first ground coupling part 741. For example, the at least one first ground coupling part 741 may include a (1_1)-th ground coupling part 741_1, a (1_2)-th ground coupling part 741_2, and a (1_3)-th ground coupling part 741_3. The (1_1)-th ground coupling part 741_1, the (1_2)-th ground coupling part 741_2, and the (1_3)-th ground coupling part 741_3 may be coupled to the second structure 732, at mutually different positions. The antenna pattern 733 may be electrically connected with the feeding part (e.g., the PCB feeding part 644) of the printed circuit board through a feeding coupling part 742 (e.g., the feeding coupling part 642). In addition, the antenna pattern 733 may be electrically connected with the PCB grounding part of the printed circuit board through a second ground coupling part 745.

According to an embodiment, an antenna length of the electronic device (e.g., the electronic device 100) may be determined depending on the position of the second ground coupling part 745. For example, when the second ground coupling part 745 is not connected to the PCB grounding part of the printed circuit board, the antenna length of the electronic device may be the first antenna length 'L1'. For example, when the second ground coupling part 745 is connected to the PCB grounding part of the printed circuit board, the antenna length of the electronic device may be the second antenna length 'L2'. When the antenna length is increased, the resonance frequency of the antenna may be decreased. When the antenna length is decreased, the resonance frequency of the antenna may be increased. Accordingly, when the position of the second ground coupling part 745 is changed, the resonance frequency of the antenna of the electronic device may be changed.

According to an embodiment, an additional switch circuit may be connected between the second ground coupling part 745 and the PCB grounding part of the printed circuit board. The switch circuit may connect or disconnect the at least one first ground coupling part 741 to or from the PCB grounding part of the printed circuit board. In addition, the switch circuit may connect or disconnect the at least one second ground coupling part 745 to or from the PCB grounding part of the printed circuit board. Accordingly, the antenna pattern 733 may operate as an antenna having various resonance frequencies. The details of the additional switch circuit will be described with reference to FIGS. 8A to 8C below.

Figure 8A:
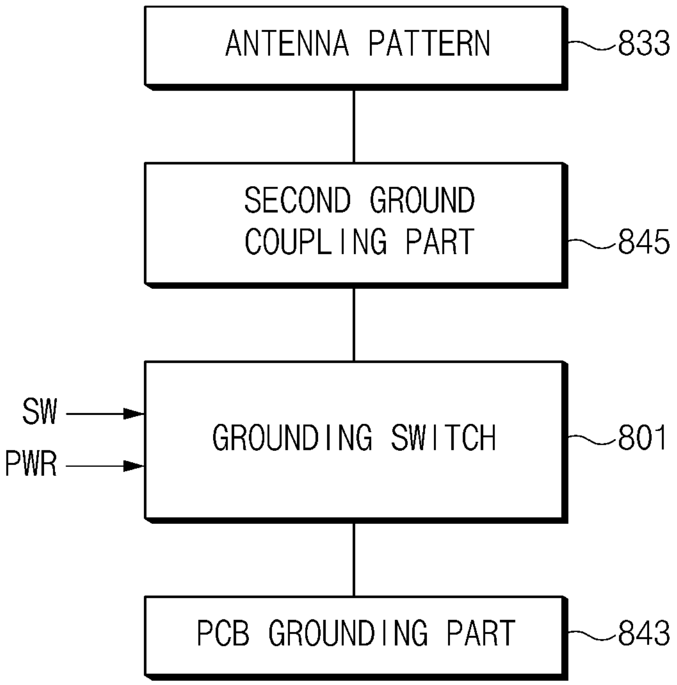
FIG. 8A is a block diagram illustrating a grounding switch connected with a second ground coupling part of FIG. 7, according to an embodiment.

FIG. 8A is a block diagram illustrating a grounding switch connected with the antenna pattern of FIG. 7, according to an embodiment.

Referring to FIG. 8A, a grounding switch 801 connects or disconnects a second ground coupling part 845 (e.g., the second ground coupling part 745) with or from a PCB grounding part 843 (e.g., the PCB grounding part 643) of a printed circuit board (e.g., the printed circuit board 640), in response to a switch control signal 'SW'.

According to an embodiment, the second ground coupling part 845 may be connected with a portion of an antenna pattern 833. The grounding switch 801 may be connected between the second ground coupling part 845 and the PCB grounding part 843 of the printed circuit board. The grounding switch 801 may receive power 'PWR' from the printed circuit board. The grounding switch 801 may receive the switch control signal 'SW' from the printed circuit board. For example, the switch control signal 'SW' may have the value of logic '0' or logic '1'. When the switch control signal 'SW' has the value of logic '1', the grounding switch 801 may be turned on to connect the second ground coupling part 845 with the PCB grounding part 843 of the printed circuit board. When the switch control signal 'SW' has the value of logic '0', the grounding switch 801 may be turned off to disconnect the second ground coupling part 845 from the PCB grounding part 843 of the printed circuit board. However, the operation of the grounding switch 801 is not limited thereto.

According to an embodiment, the resonance frequency of the antenna of the electronic device (e.g., the electronic device 100) may be varied depending on whether the second ground coupling part 845 is connected with the PCB grounding part 843 of the printed circuit board. For example, the resonance frequency of the electronic device may be more increased when the second ground coupling part 845 is connected with the PCB grounding part 843 of the printed circuit board, as compared to when the second ground coupling part 845 is disconnected from the PCB grounding part 843 of the printed circuit board. In addition, when the position of the second ground coupling part 845 is changed, the resonance frequency of the antenna of the electronic device may be changed.

Figure 8B:
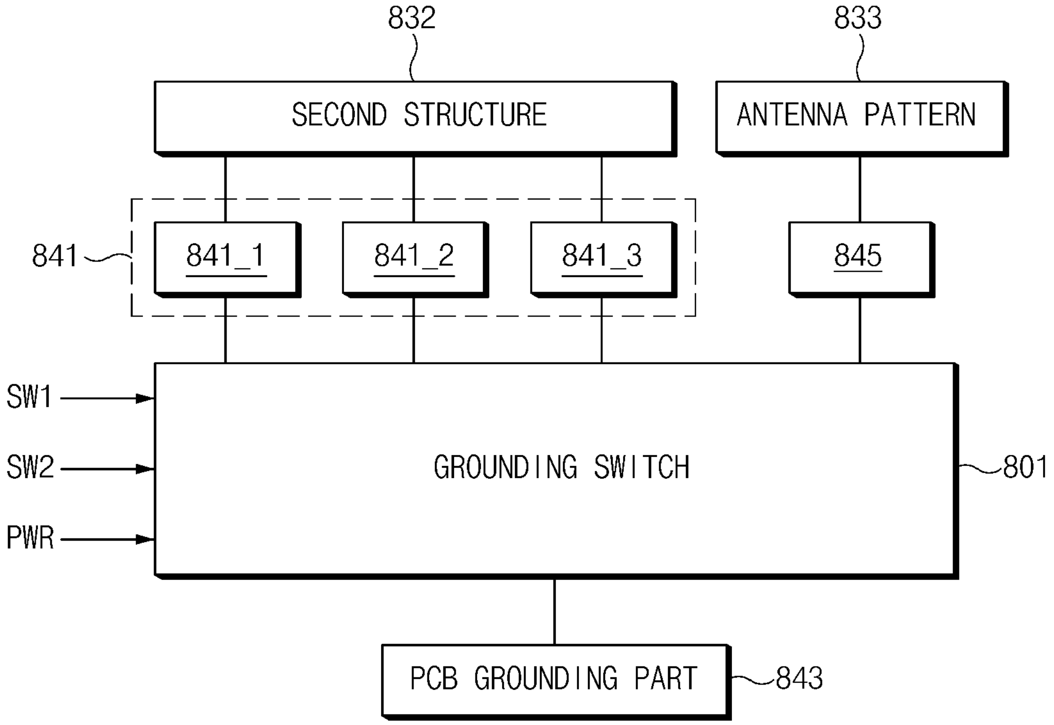
FIG. 8B is a block diagram illustrating a grounding switch connected with a second structure and an antenna pattern of FIG. 7, according to an embodiment.

FIG. 8B is a block diagram illustrating a grounding switch connected with the second structure and the antenna pattern of FIG. 7, according to an embodiment.

Referring to FIG. 8B, the grounding switch 801 may connect or disconnect a first ground coupling part 841 (e.g., the first ground coupling part 741) and the second ground coupling part 845 (e.g., the second ground coupling part 745) with or from the PCB grounding part 843 (e.g., the PCB grounding part 643) of the printed circuit board (e.g., the printed circuit board 640) through mutually different paths, in response to switch control signal 'SW1 and 'SW2'.

According to an embodiment, the first ground coupling part 841 may include a (1_1)-th ground coupling part 841_1 (e.g., the (1_1)-th ground coupling part 741_1), a (1_2)-th ground coupling part 841_2 (e.g., the (1_2)-th ground coupling part 741_2), and a (1_3)-th ground coupling part 841_3 (e.g., the (1_3)-th ground coupling part 741_3)). The (1_1)-th ground coupling part 841_1, the (1_2)-th ground coupling part 841_2, and the (1_3)-th ground coupling part 841_3 may be coupled to a portion of a second structure 832 (e.g., the second structure 732). The (1_1)-th ground coupling part 841_1, the (1_2)-th ground coupling part 841_2, and the (1_3)-th ground coupling part 841_3 may be coupled to the second structure 832, at mutually different positions. However, the numbers of the first ground coupling parts 841 is not limited thereto. According to various embodiments, the second structure 832 may be connected with a larger number of or a smaller number of first ground coupling parts 841. According to an embodiment, the second ground coupling part 845 may be connected with a portion of the antenna pattern 833. The grounding switch 801 may be connected between the first ground coupling part 841 and the PCB grounding part 843 of the printed circuit board and between the second ground coupling part 845 and the PCB grounding part 843 of the printed circuit board.

According to an embodiment, the grounding switch 801 may receive power 'PWR' from the printed circuit board. The grounding switch 801 may receive the first and second switch control signals 'SW1' and 'SW2' from a communication processor (e.g., a communication module 1390) mounted on a printed circuit board. For example, each of the first and second switch control signals 'SW1' and 'SW2' may have the value of logic '0' or logic '1'. The grounding switch 801 may connect at least one of the (1_1)-th ground coupling part 841_1, the (1_2)-th ground coupling part 841_2, the (1_3)-th ground coupling part 841_3, and the second ground coupling part 845 with the PCB grounding part 843 of the printed circuit board, based on the combination of the first switch control signal 'SW1' and the second switch control signal 'SW2'. However, the number of switch control signals is not limited thereto. According to various embodiments, a communication processor may control the grounding switch 801 through more switch control signals. The grounding switch 801 may connect at least one of a plurality of first ground coupling parts 841 and a plurality of second ground coupling parts 845 with the PCB grounding part 843 of the printed circuit board in response to the switch control signals.

According to an embodiment, the resonance frequency of the antenna of the electronic device (e.g., the electronic device 100) may be varied depending on whether the first ground coupling part 841 is connected with the PCB grounding part 843 of the printed circuit board. In addition, the resonance frequency of the antenna of the electronic device may be varied depending on whether the second ground coupling part 845 is connected with the PCB grounding part 843 of the printed circuit board. For example, the resonance frequency of the antenna of the electronic device may be varied depending on the connection position between the PCB grounding part 843 of the printed circuit board and the second structure 832, or the connection position between the PCB grounding part 843 of the printed circuit board and the antenna pattern 833.

Figure 8C:
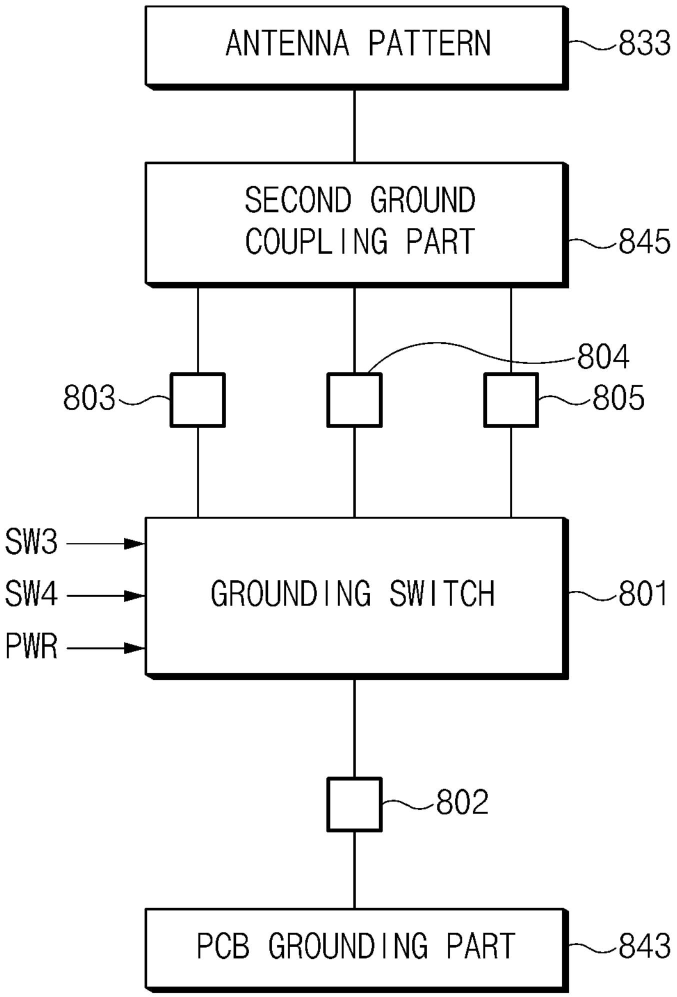
FIG. 8C is a block diagram illustrating a grounding switch connected with a second ground coupling part of FIG. 7, according to another embodiment.

FIG. 8C is a block diagram illustrating a grounding switch connected with the antenna pattern of FIG. 7, according to another embodiment.

Referring to FIG. 8C, the grounding switch 801 connects or disconnects the second ground coupling part 845 (e.g., the second ground coupling part 745) with or from the PCB grounding part 843 (e.g., the PCB grounding part 643) of a printed circuit board (e.g., the printed circuit board 640) through mutually different paths, in response to a third switch control signal 'SW3' and a fourth switch control signal 'SW4'.

According to an embodiment, the second ground coupling part 845 may be connected with a portion of the antenna pattern 833. The grounding switch 801 may be connected between the second ground coupling part 845 and the PCB grounding part 843 of the printed circuit board. A first passive device 802 may be connected between the grounding switch 801 and the PCB grounding part 843 of the printed circuit board. Second to fourth passive devices 803, 804, and 805 are connected between the grounding switch 801 and the second ground coupling part 845.

According to an embodiment, the grounding switch 801 may receive power 'PWR' from the printed circuit board. The grounding switch 801 may receive the third switch control signal 'SW3' and the fourth switch control signal 'SW4' from a communication processor (e.g., the communication module 1390) mounted on the printed circuit board. For example, the third switch control signal 'SW3' and the fourth switch control signal 'SW4' may have the value of logic '0' or logic '1'. The grounding switch 801 may perform a connection operation by selecting one from the second to fourth passive devices 803, 804, and 805 or may disconnect the second ground coupling part 845 from the PCB grounding part 843 of the printed circuit board, in response to the combination of the third switch control signal 'SW3' and the fourth switch control signal 'SW4'. The resonance frequency of the antenna may be varied depending on the type and the capacity of the second to fourth passive devices 803, 804, and 805. For example, each of the second to fourth passive devices 803, 804, and 805 may include an inductor or a capacitor. When the inductor is connected between the second ground coupling part 845 and the PCB grounding part 843 of the printed circuit board, the resonance frequency of the antenna may be relatively decreased. When the capacitor is connected between the second ground coupling part 845 and the PCB grounding part 843 of the printed circuit board, the resonance frequency of the antenna may be relatively increased.

According to an embodiment, the first passive device 802 may be connected between the grounding switch 801 and the PCB grounding part 843 of the printed circuit board. For example, the first passive device 802 may include an inductor or a capacitor. The resonance frequency of the antenna may be determined through the combination of the first passive device 802 and one selected from the second to fourth passive devices 803, 804, and 805.

However, the configuration of the first to fourth passive devices 802, 803, 804, and 805 and the grounding switch 801 are not limited thereto.

Figure 9:
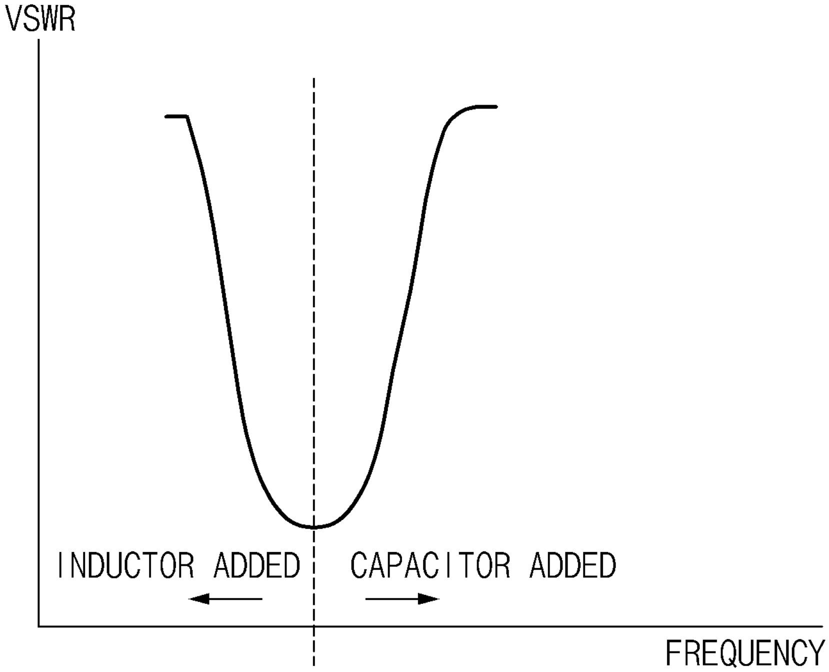
FIG. 9 is a graph illustrating a change in a resonance frequency of an antenna depending on a configuration of an inductor or a capacitor in FIG. 8C.

FIG. 9 is a graph illustrating a change in a resonance frequency of an antenna depending on a configuration of an inductor or a capacitor in FIG. 8C.

Referring to FIGS. 8C and 9, the resonance frequency of the antenna of the electronic device (e.g., the electronic device 100) is determined through the combination of the first passive device 802 and one selected from the second to fourth passive elements 803, 804, and 805. According to an embodiment, when the passive element selected from among the second to fourth passive elements 803, 804, and 805 is an inductor, the resonance frequency of the antenna may be relatively decreased. The resonance frequency of the antenna may be decreased in proportion to the size of the capacity of the inductor.

According to an embodiment, when the passive element selected from among the second to fourth passive elements 803, 804, and 805 is a capacitor, the resonance frequency of the antenna may be relatively increased. The resonance frequency of the antenna may be increased in proportion to the size of the capacitance of the capacitor.

Figure 10:
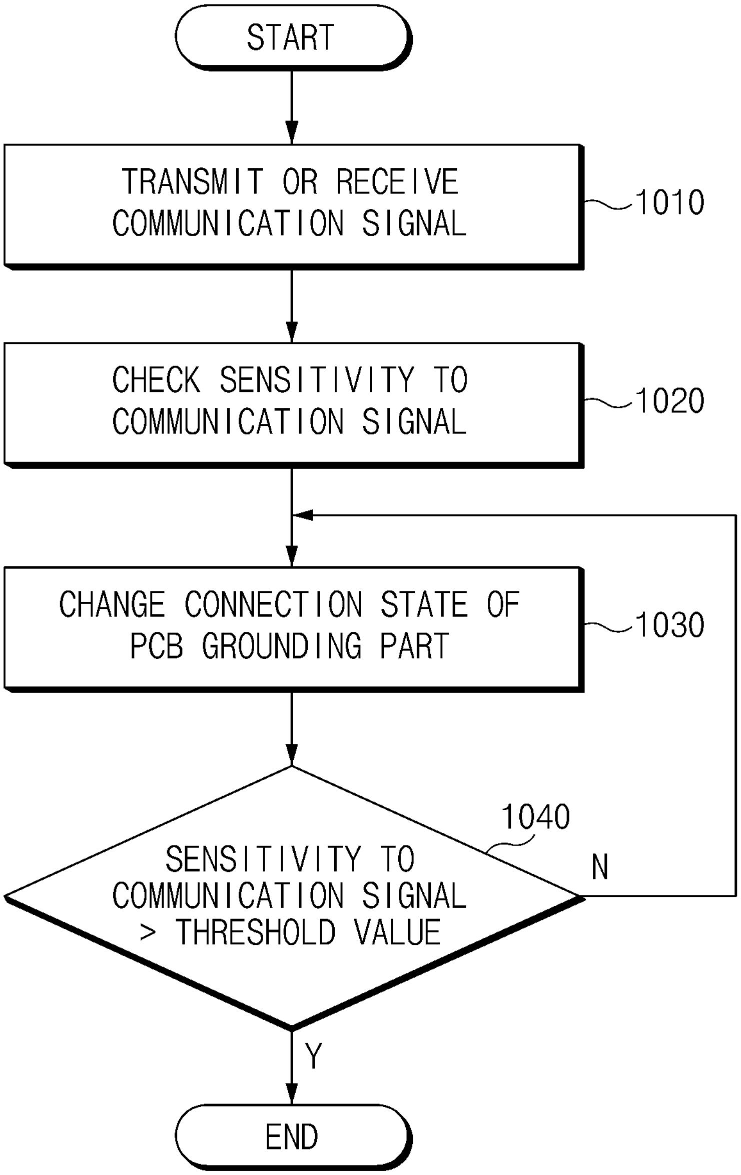
FIG. 10 is a flowchart illustrating a control operation of an antenna, according to an embodiment of the disclosure.

FIG. 10 is a flowchart illustrating a control operation of an antenna, according to an embodiment of the disclosure.

Referring to FIGS. 8A to 8C, and 10, the electronic device (e.g., the electronic device 100) may change the antenna frequency by changing the connection state of the PCB grounding part (e.g., the PCB grounding part 843) of the printed circuit board if necessary.

According to an embodiment, the electronic device may transmit or receive a communication signal, in operation 1010. For example, the communication processor (e.g., the processor 1320 or the communication module 1390) may transmit or receive the communication signal through the antenna (e.g., the antenna pattern 833) to make communication with the external device (e.g., a first external electronic device 1302, a second external device 1304, or a server 1308).

According to an embodiment, the electronic device may check the sensitivity to the communication signal, in operation 1020. For example, the communication processor may compare the sensitivity to the communication signal with a reference value.

According to an embodiment, the electronic device may change the connection state of the PCB grounding part, in operation 1030. For example, when the sensitivity to the communication signal is less than a reference value, the communication processor may control the grounding switch (e.g., the grounding switch 801). The communication processor may generate a switch control signal (or switch control signals; for example, the first to fourth switch control signals 'SW1', 'SW2', 'SW3', and 'SW4') to control the grounding switch.

According to an embodiment, the grounding switch may connect at least one of the plurality of first ground coupling parts (e.g., the first ground coupling part 841) and the plurality of second ground coupling parts (e.g., the second ground coupling part 845) with the PCB grounding part, in response to the switch control signal (or switch control signals). For example, the first ground coupling part may be connected between the second structure (e.g., the second structure 832) of the bracket (e.g., the bracket 130) and the PCB grounding part. The second ground coupling part may be connected between the antenna pattern (e.g., the antenna pattern 833) of the bracket with the PCB grounding part. The grounding switch may connect or disconnect the first ground coupling part with or from the PCB grounding part, in response to the switch control signal (or the switch control signals). In addition, the grounding switch may connect or disconnect the second ground coupling part with or from the PCB grounding part, in response to the switch control signal (or the switch control signals). The frequency of the antenna may be changed depending on the connection state between the first ground coupling part (or the second ground coupling part) and the PCB grounding part.

According to an embodiment, the electronic device may compare the sensitivity to the communication signal with a threshold value, in operation 1040. For example, the communication processor may determine whether the change in frequency of the antenna is proper, based on the sensitivity to the communication signal. When the sensitivity to the communication signal is less than the threshold value, the communication processor may repeatedly perform operation 1030 and determine a proper antenna frequency.

Figure 11:
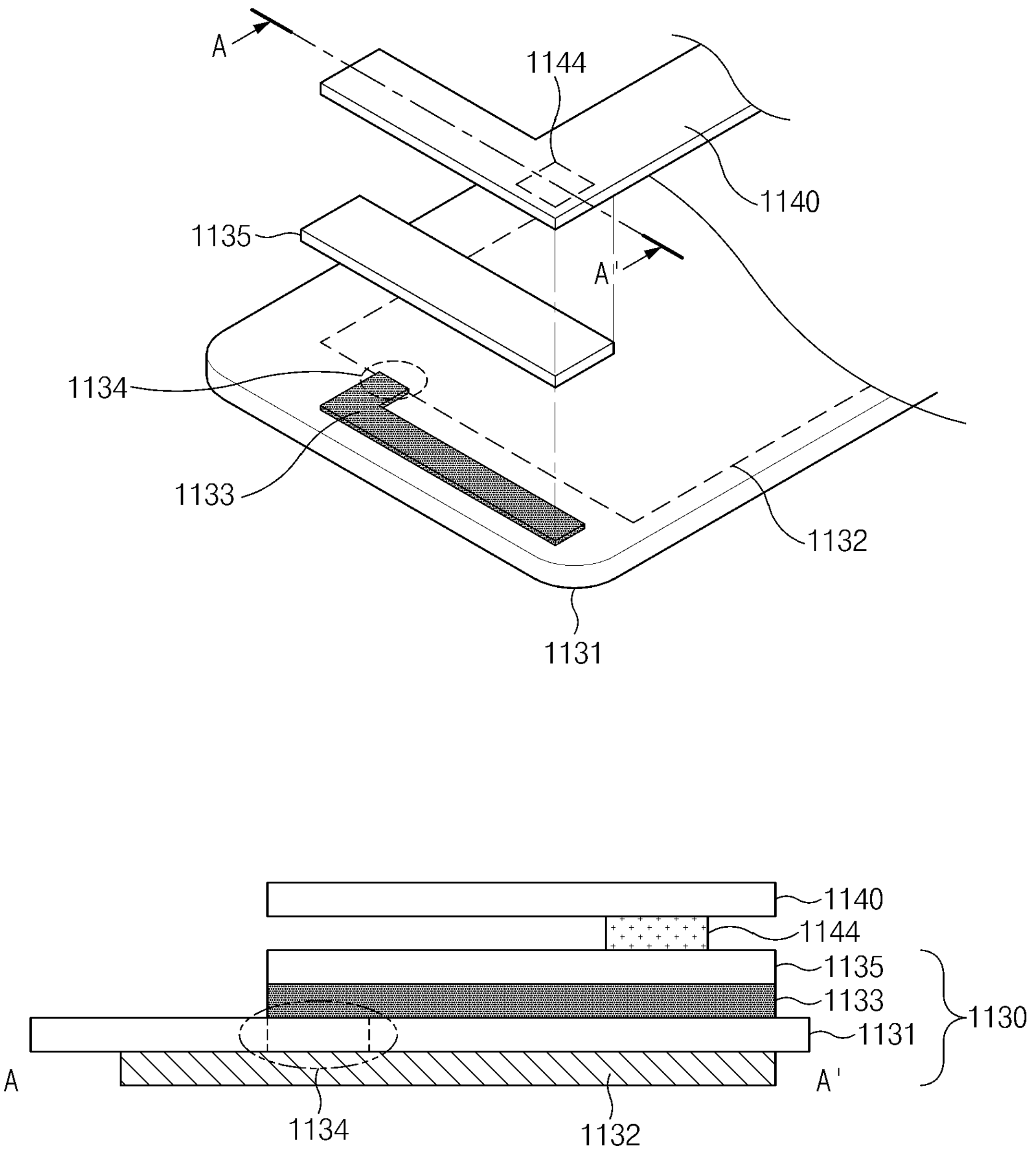
FIG. 11 is a view a manner of feeding power to an antenna pattern through a coupling manner, according to an embodiment of the disclosure.

FIG. 11 is a view a manner of feeding power to an antenna pattern through a coupling manner, according to an embodiment of the disclosure.

Referring to FIG. 11, a bracket 1130 (e.g., the bracket 130) may include a first structure 1131, a second structure 1132, and an antenna pattern 1133. The second structure 1132 may be disposed on a first surface of the first structure 1131, and the antenna pattern 1133 may be disposed on a second surface of the first structure 1131. The antenna pattern 1133 may be electrically connected with the second structure 1132 through a pattern connection part 1134.

According to an embodiment, a printed circuit board 1140 (e.g., the printed circuit board 140) may be disposed on the second surface of the first structure 1131. A feeding part 1144 may be formed on the printed circuit board 1140. The feeding part 1144 may be formed at a position corresponding to a portion of the antenna pattern 1133. A dielectric layer 1135 may be interposed between the feeding part 1144 and the antenna pattern 1133. The feeding part 1144 may feed power to the antenna pattern 1133 in a coupling manner.

Figure 12:
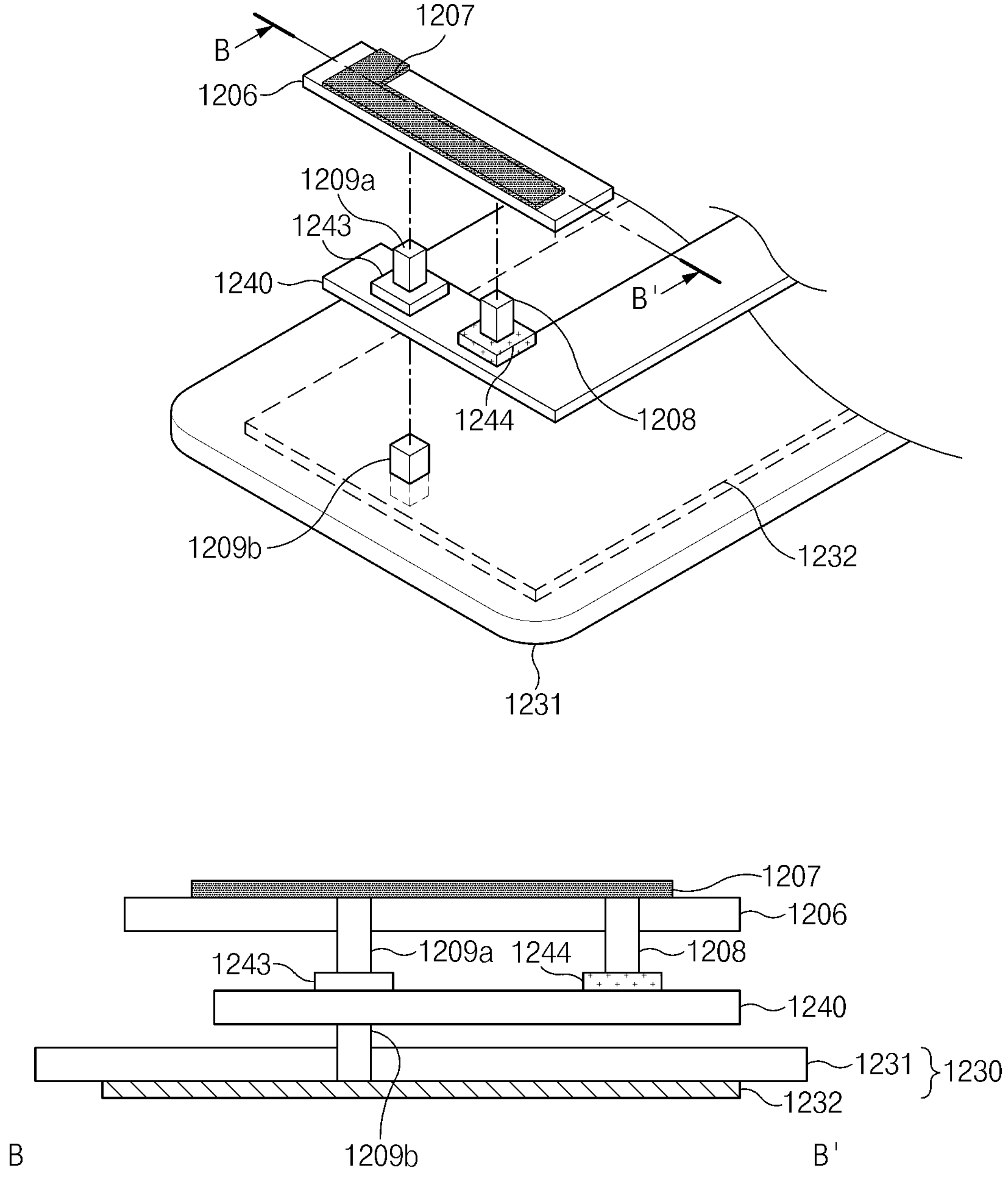
FIG. 12 is a view illustrating a manner of realizing an antenna by using a carrier, according to an embodiment of the disclosure.

FIG. 12 is a view illustrating a manner of realizing an antenna by using a carrier, according to an embodiment of the disclosure.

Referring to FIG. 12, an antenna pattern 1207 may be formed on a carrier 1206. According to an embodiment, a printed circuit board 1240 (e.g., the printed circuit board 140) may be interposed between the carrier 1206 and a bracket 1230 (e.g., the bracket 130). The bracket 1230 may include a first structure 1231 and a second structure 1232. For example, the first structure 1231 may include a non-conductive material, and the second structure 1232 may include a conductive material.

According to an embodiment, the printed circuit board 1240 may include a grounding part 1243 and a feeding part 1244. The feeding part 1244 may be electrically connected with a portion of the antenna pattern 1207 through a feeding coupling part 1208. The grounding part 1243 may be electrically connected with the antenna pattern 1207 through a first ground coupling part 1209*a*. The grounding part 1243 may be electrically connected with the second structure 1232 through a second ground coupling part 1209*b*. Accordingly, a volume of an antenna of an electronic device (e.g., the electronic device 100) is set to an area between the antenna pattern 1207 and the second structure 1232. When the second structure 1232 is not connected to the grounding part 1243, the volume of the antenna of the electronic device may be limited to an area including the antenna pattern 1207 and the printed circuit board 1240.

According to various embodiments, an electronic device (e.g., the electronic device 100) may include a bracket (e.g., a bracket 130) including a first structure (e.g., the first structure) at least partially having non-conductivity, a second structure (e.g., the second structure 132) disposed on a first surface of the first structure and at least partially having conductivity, and an antenna pattern (e.g., the antenna pattern 133) electrically connected with the second structure and disposed on a second surface of the first structure, and a printed circuit board (e.g., the printed circuit board 140) including a grounding part (e.g., the PCB grounding part 643) and a feeding part (e.g., the feeding part 644). The grounding part may be electrically connected with the second structure, and the feeding part may be electrically connected with a portion of the antenna pattern.

According to various embodiments, the antenna pattern (e.g., 233 of FIG. 2) may be disposed at a lower portion of the first structure. Alternatively, the antenna pattern (e.g., 333 of FIG. 3) is disposed at an upper portion of the first structure. Alternatively, the antenna pattern (e.g., 433 of FIG. 4 or 533 of FIG. 5) may be disposed on a side surface of the first structure.

According to various embodiments, the first structure, the second structure, and the antenna pattern may be formed in a double-injection manner. The antenna pattern may be spaced apart from the second structure by a specific distance (e.g., D1 of FIG. 2). A connection part (e.g., 234 of FIG. 2) between the antenna pattern and the second structure passes through the first structure.

According to various embodiments, the grounding part is electrically connected with the second structure through at least one ground coupling part (e.g., 241 of FIG. 2).

According to various embodiments, the grounding part is electrically connected with the second structure through at least one first ground coupling part (e.g., 741 of FIG. 7), and is electrically connected with a specific position of the antenna pattern through a second ground coupling part (e.g., 745 of FIG. 7). The electronic device may further include a grounding switch (e.g., 801 of FIGS. 8A to 8C) interposed between the grounding part and the second ground coupling part to electrically connect the grounding part with the second ground coupling part or to electrically disconnect the grounding part from the second ground coupling part, in response to a switch control signal. The electronic device may further include a plurality of passive devices (e.g., 802 to 805 of FIG. 8C) connected between the grounding switch and the second ground coupling part, and the grounding switch may electrically connect the grounding part with the second ground coupling part through at least one selected from the plurality of passive devices in response to the switch control signal.

According to various embodiments, the bracket may further include a dielectric layer (e.g., 1135 of FIG. 11) interposed between the feeding part (e.g., 1144 of FIG. 11) and the antenna pattern, and the feeding part may be disposed at a position corresponding to the portion of the antenna pattern to feed power to the antenna pattern in a coupling manner.

According to an embodiment of the disclosure, an antenna structure realized in a bracket may include a first structure having non-conductivity, a second structure having conductivity and disposed on a first surface of the first structure, and an antenna pattern electrically connected with the second structure and disposed on a second surface of the first structure. The first structure, the second structure, and the antenna pattern may be formed in a double-injection manner. The antenna pattern may be spaced apart from the second structure by a specific distance. A connection portion between the antenna pattern and the second structure may pass through the first structure.

According to various embodiments, the first structure may include a material different from a material of the second structure and a material of the antenna pattern. The first antenna structure may include a polymer material, and each of the second structure and the antenna pattern may include a metal material.

According to various embodiments, an electronic device may include a carrier having an antenna pattern, a bracket including a first structure at least partially having non-conductivity, and a second structure disposed on a first surface of the first structure and at least partially having conductivity, and a printed circuit board disposed on a second surface of the first structure, interposed between the carrier and the bracket, and including a grounding part and a feeding part. The grounding part may be electrically connected with the first structure and a first part of the antenna pattern, and the feeding part may be electrically connected with a second part of the antenna pattern. A volume of an antenna pattern realized through the antenna pattern may be set to an area between the second structure and the antenna pattern.

Figure 13:
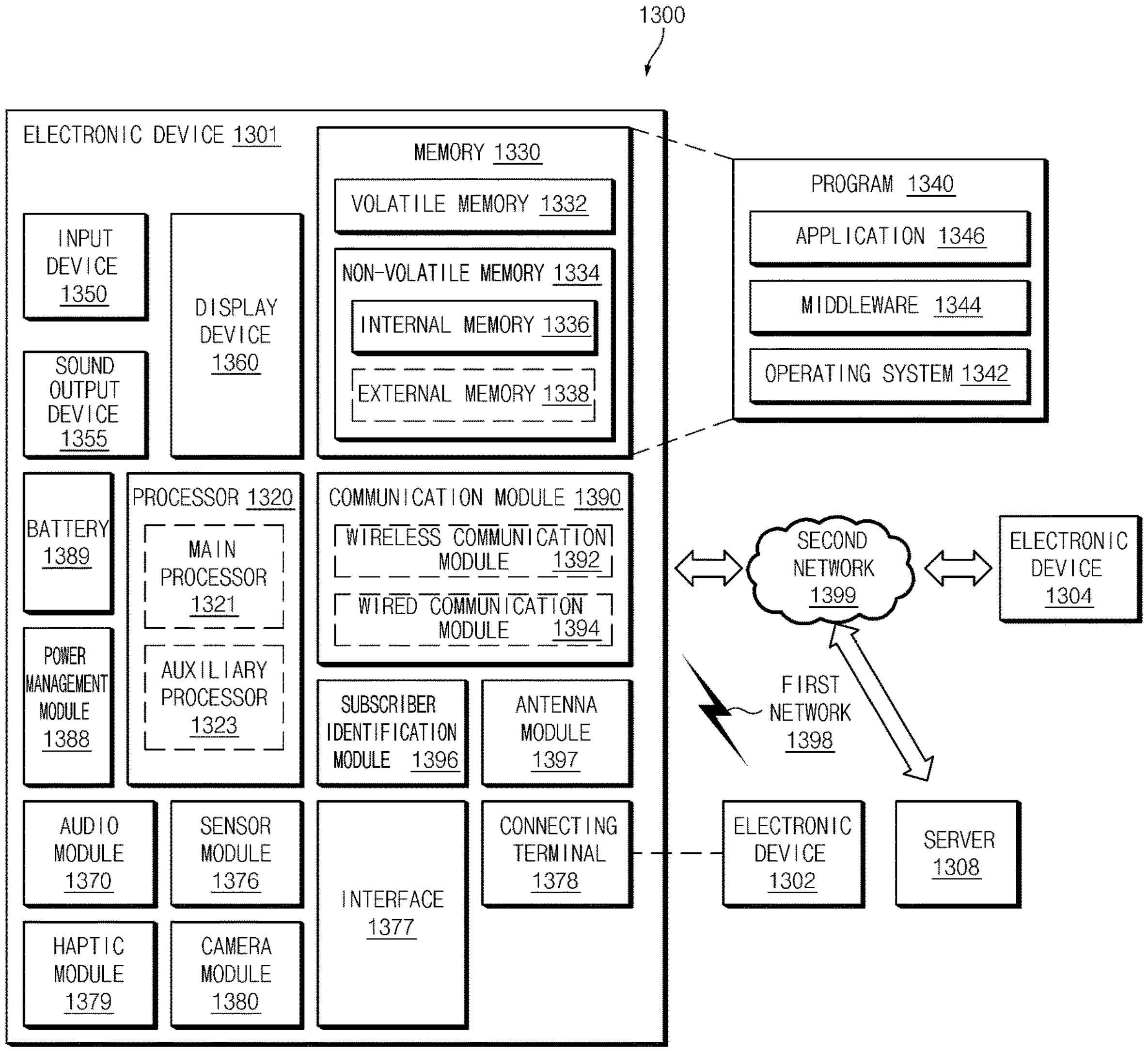
FIG. 13 illustrates an electronic device in a network environment, according to various embodiments.

FIG. 13 illustrates an electronic device 1301 (e.g., the electronic device 100) in a network environment 1300, according to various embodiments. According to various embodiments disclosed in the disclosure, the electronic device may include various types of devices. For example, the electronic device may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the disclosure, the term "user" used herein may refer to a person who uses the electronic device or may refer to a device (e.g., an artificial intelligence electronic device) that uses the electronic device.

Referring to FIG. 13, under the network environment 1300, the electronic device 1301 may communicate with an electronic device 1302 through local wireless communication 1398 or may communication with an electronic device 1304 or a server 1308 through a network 1399. According to an embodiment, the electronic device 1301 may communicate with the electronic device 1304 through the server 1308.

According to an embodiment, the electronic device 1301 may include a bus 1310, a processor 1320, a memory 1330, an input device 1350 (e.g., a micro-phone or a mouse), a display device 1360, an audio module 1370, a sensor module 1376, an interface 1377, a haptic module 1379, a camera module 1380, a power management module 1388, a battery 1389, a communication module 1390 (e.g., the communication module 160), and a subscriber identification module 1396. According to an embodiment, the electronic device 1301 may not include at least one (e.g., the display device 1360 or the camera module 1380) of the above-described elements or may further include other element(s).

The bus 1310 may interconnect the above-described elements 1320 to 1390 and may include a circuit for conveying signals (e.g., a control message or data) between the above-described elements.

The processor 1320 may include one or more of a central processing unit (CPU), an application processor (AP), a graphic processing unit (GPU), an image signal processor (ISP) of a camera or a communication processor (CP). According to an embodiment, the processor 1320 may be implemented with a system on chip (SoC) or a system in package (SiP). For example, the processor 1320 may drive an operating system (OS) or an application to control at least one of another element (e.g., hardware or software element) connected to the processor 1320 and may process and compute various data. The processor 1320 may load a command or data, which is received from at least one of other elements (e.g., the communication module 1390), into a volatile memory 1332 to process the command or data and may store the process result data into a nonvolatile memory 1334.

The memory 1330 may include, for example, the volatile memory 1332 or the nonvolatile memory 1334. The volatile memory 1332 may include, for example, a random access memory (RAM) (e.g., a dynamic RAM (DRAM), a static RAM (SRAM), or a synchronous dynamic RAM (SDRAM)). The nonvolatile memory 1334 may include, for example, an one time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 1334 may be configured in the form of an internal memory 1336 or the form of an external memory 1338 which is available through connection only if necessary, according to the connection with the electronic device 1301. The external memory 1338 may further include a flash drive such as compact flash (CF), secure digital (SD), micro secure digital (Micro-SD), mini secure digital (Mini-SD), extreme digital (xD), a multimedia card (MMC), or a memory stick. The external memory 1338 may be operatively or physically connected with the electronic device 1301 in a wired manner (e.g., a cable or a universal serial bus (USB)) or a wireless (e.g., Bluetooth) manner.

For example, the memory 1330 may store, for example, at least one different software element, such as a command or data associated with the program 1340, of the electronic device 1301. The program 1340 may include, for example, a kernel 1341, a library 1343, an application framework 1345 or an application program (interchangeably, "application") 1347.

The input device 1350 may include a microphone, a mouse, or a keyboard. According to an embodiment, the keyboard may include a keyboard physically connected or a keyboard virtually displayed through the display device 1360.

The display device 1360 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1301.

The audio module 1370 may convert, for example, from a sound into an electrical signal or from an electrical signal into the sound. According to an embodiment, the audio module 1370 may acquire sound through the input device 1350 (e.g., a microphone) or may output sound through an output device (not illustrated) (e.g., a speaker or a receiver) included in the electronic device 1301, an external electronic device (e.g., the electronic device 1302 (e.g., a wireless speaker or a wireless headphone)) or an electronic device 1306 (e.g., a wired speaker or a wired headphone) connected with the electronic device 1301

The sensor module 1376 may measure or detect, for example, an internal operating state (e.g., power or temperature) or an external environment state (e.g., an altitude, a humidity, or brightness) of the electronic device 1301 to generate an electrical signal or a data value corresponding to the information of the measured state or the detected state.

The sensor module 1376 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an electronic nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1376 may further include a control circuit for controlling at least one or more sensors included therein. According to an embodiment, the electronic device 1301 may control the sensor module 1376 by using the processor 1320 or a processor (e.g., a sensor hub) separate from the processor 1320. In the case that the separate processor (e.g., a sensor hub) is used, while the processor 1320 is in a sleep state, the electronic device 1301 may operate without awakening the processor 1320 to control at least a portion of the operation or the state of the sensor module 1376.

According to an embodiment, the interface 1377 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1378 may physically connect the electronic device 1301 and the electronic device 1306. According to an embodiment, the connector 1378 may include, for example, an USB connector, an SD card/MMC connector, or an audio connector (e.g., a headphone connector).

The haptic module 1379 may convert an electrical signal into mechanical stimulation (e.g., vibration or motion) or into electrical stimulation. For example, the haptic module 1379 may apply tactile or kinesthetic stimulation to a user. The haptic module 1379 may include, for example, a motor, a piezoelectric element, or an electric stimulator.

The camera module 1380 may capture, for example, a still image and a moving picture. According to an embodiment, the camera module 1380 may include at least one lens (e.g., a wide-angle lens and a telephoto lens, or a front lens and a rear lens), an image sensor, an image signal processor, or a flash (e.g., a light emitting diode or a xenon lamp).

The power management module 1388, which is to manage the power of the electronic device 1301, may constitute at least a portion of a power management integrated circuit (PMIC).

The battery 1389 may include a primary cell, a secondary cell, or a fuel cell and may be recharged by an external power source to supply power at least one element of the electronic device 1301.

The communication module 1390 may establish a communication channel between the electronic device 1301 and an external device (e.g., the first external electronic device 1302, the second external electronic device 1304, or the server 1308). The communication module 1390 may support wired communication or wireless communication through the established communication channel. According to an embodiment, the communication module 1390 may include a wireless communication module 1392 or a wired communication module 1394. The communication module 1390 may communicate with the external device through a first network 1398 (e.g. a wireless local area network such as Bluetooth or infrared data association (IrDA)) or a second network 1399 (e.g., a wireless wide area network such as a cellular network) through a relevant module among the wireless communication module 1392 or the wired communication module 1394.

The wireless communication module 1392 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NEC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1392 supports cellar communication, the wireless communication module 1392 may, for example, identify or authenticate the electronic device 1301 within a communication network using the subscriber identification module 1396. According to an embodiment, the wireless communication module 1392 may include a communication processor (CP) separate from the processor 2820 (e.g., an application processor (AP). In this case, the communication processor may perform at least a portion of functions associated with at least one of elements 1310 to 1396 of the electronic device 1301 in substitute for the processor 1320 when the processor 1320 is in an inactive (sleep) state, and together with the processor 1320 when the processor 1320 is in an active state. According to an embodiment, the wireless communication module 1392 may include a plurality of communication modules, each supporting only a relevant communication scheme among cellular communication, short-range wireless communication, or a GNSS communication scheme.

The wired communication module 1394 may include, for example, include a local area network (LAN) service, a power line communication, or a plain old telephone service (POTS).

For example, the first network 1398 may employ, for example, Wi-Fi direct or Bluetooth for transmitting or receiving commands or data through wireless direct connection between the electronic device 1301 and the first external electronic device 1302. The second network 1399 may include a telecommunication network (e.g., a computer network such as a LAN or a WAN, the Internet or a telephone network) for transmitting or receiving commands or data between the electronic device 1301 and the second electronic device 1304.

According to embodiments, the commands or the data may be transmitted or received between the electronic device 1301 and the second external electronic device 1304 through the server 1308 connected with the second network. Each of the external first and second external electronic devices 1302 and 1304 may be a device of which the type is different from or the same as that of the electronic device 1301. According to various embodiments, all or a part of operations that the electronic device 1301 will perform may be executed by another or a plurality of electronic devices (e.g., the electronic devices 1302 and 1304 or the server 1308). According to an embodiment, in the case that the electronic device 1301 executes any function or service automatically or in response to a request, the electronic device 1301 may not perform the function or the service internally, but may alternatively or additionally transmit requests for at least a part of a function associated with the electronic device 1301 to any other device (e.g., the electronic device 1302 or 1304 or the server 1308). The other electronic device (e.g., the electronic device 1302 or 1304 or the server 1308) may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions “A or B”, “at least one of “A and/or B”, “at least one of A and/or B”, “A, B, or C”, or “at least one of “A, B, and/or C”, and the like used herein may include any and all combinations of one or more of the associated listed items. Expressions such as “first,” or “second,” and the like, may express their elements regardless of their priority or importance and may be used to distinguish one element from another element but is not limited to these components. When an (e.g., first) element is referred to as being “(operatively or communicatively) coupled with/to” or “connected to” another (e.g., second) element, it may be directly coupled with/to or connected to the other element or an intervening element (e.g., a third element) may be present.

According to the situation, the expression “adapted to or configured to” used herein may be interchangeably used as, for example, the expression “suitable for”, “having the capacity to”, “changed to”, “made to”, “capable of” or “designed to”. The expression “a device configured to” may mean that the device is “capable of” operating together with another device or other components. For example, a “processor configured to (or set to) perform A, B, and C” may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1330).

The term “module” used herein may include a unit, which is implemented with hardware, software, or firmware, and may be interchangeably used with the terms “logic”, “logical block”, “component”, “circuit”, or the like. The “module” may be a minimum unit of an integrated component or a part thereof or may be a minimum unit for performing one or more functions or a part thereof. The “module” may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1330) in the form of a program module. The instruction, when executed by a processor (e.g., a processor 1320), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

The invention claimed is:

1. An electronic device comprising:

a bracket including a first structure at least partially having non-conductivity, a second structure disposed on a first surface of the first structure and at least partially having conductivity, and an antenna pattern electrically connected with the second structure and disposed on a second surface of the first structure; and a printed circuit board including a grounding part and a feeding part, wherein the grounding part is electrically connected with the second structure, wherein the feeding part is electrically connected with a portion of the antenna pattern, and wherein a connection part between the antenna pattern and the second structure passes through the first structure.

2. The electronic device of claim 1, wherein the antenna pattern is disposed at an upper portion of the first structure, a lower portion of the first structure, or on a side surface of the first structure.

3. The electronic device of claim 1, wherein the first structure, the second structure, and the antenna pattern are formed in a double-injection manner.

4. The electronic device of claim 1, wherein the antenna pattern is spaced apart from the second structure by a specific distance.

5. The electronic device of claim 1, wherein the grounding part is electrically connected with the second structure through at least one ground coupling part.

6. The electronic device of claim 1, wherein the grounding part is electrically connected with the second structure through at least one first ground coupling part, and is electrically connected with a specific position of the antenna pattern through a second ground coupling part.

7. The electronic device of claim 6, further comprising:

a grounding switch interposed between the grounding part and the second ground coupling part to electrically connect the grounding part with the second ground coupling part or to electrically disconnect the grounding part from the second ground coupling part, in response to a switch control signal.

8. The electronic device of claim 7, further comprising:

a plurality of passive devices connected between the grounding switch and the second ground coupling part, wherein the grounding switch electrically connects the grounding part with the second ground coupling part through at least one selected from the plurality of passive devices in response to the switch control signal.

9. The electronic device of claim 1, wherein the bracket further includes a dielectric layer interposed between the feeding part and the antenna pattern, and wherein the feeding part is disposed at a position corresponding to the portion of the antenna pattern to feed power to the antenna pattern in a coupling manner.

10. An antenna structure realized in a bracket, the antenna structure comprising:

a first structure having non-conductivity;

a second structure having conductivity and disposed on a first surface of the first structure;

an antenna pattern electrically connected with the second structure and disposed on a second surface of the first structure; and a printed circuit board including a grounding part and a feeding part, wherein the grounding part is electrically connected with the second structure, wherein the feeding part is electrically connected with a portion of the antenna pattern, and wherein a connection part between the antenna pattern and the second structure passes through the first structure.

11. The antenna structure of claim 10, wherein the first structure includes a material different from a material of the second structure and a material of the antenna pattern.

12. The antenna structure of claim 11, wherein the first structure includes a polymer material, and wherein each of the second structure and the antenna pattern includes a metal material.

13. An electronic device comprising:

a carrier having an antenna pattern;

a bracket including a first structure at least partially having non-conductivity, and a second structure disposed on a first surface of the first structure and at least partially having conductivity; and a printed circuit board disposed on a second surface of the first structure, interposed between the carrier and the bracket, and including a grounding part and a feeding part, wherein the grounding part is electrically connected with the first structure and a first part of the antenna pattern, wherein the feeding part is electrically connected with a second part of the antenna pattern, and wherein a volume of an antenna realized through the antenna pattern is set to an area between the second structure and the antenna pattern.

* * * * *